United States Patent

[11] 3,529,582

[72] Inventors Bohdan Hurko;
 A. Melcher Anderson, Louisville, Kentucky
[21] Appl. No. 782,067
[22] Filed Dec. 9, 1968
[45] Patented Sept. 22, 1970
[73] Assignee General Electric Company
 a corporation of New York

[54] SELF-CLEANING FORCED CONVECTION OVEN
 11 Claims, 4 Drawing Figs.
[52] U.S. Cl. .................................................. 126/21,
 219/400
[51] Int. Cl. ....................................................... A21b 1/00
[50] Field of Search ............................................. 126/19, 21,
 21A; 219/400

[56] References Cited
 UNITED STATES PATENTS
 2,408,331 9/1946 Mills .............................. 126/21(A)UX
 3,160,153 12/1964 Drayer ........................ 126/21(A)UX
 3,279,451 10/1966 Oehring ....................... 126/21(A)UX
 3,414,708 12/1968 Maier .......................... 219/400
Primary Examiner—Charles J. Myhre Attorneys—Richard L. Caslin and Harry F. Manbeck, Jr., Oscar B. Waddell, Melvin M. Goldenberg and Frank L. Neuhauser ABSTRACT: This invention relates to a baking and broiling oven for the preparation of food, and particularly to an electric oven with but a single source of heat located in the top of the oven for both baking and broiling. During the normal baking operations, a blower wheel located adjacent the top heating element is energized to create a strong upward draft in the center of the oven and to discharge the air over the heating means. An air diffusion plate cooperates with the heating means as a source of radiant heat, and also provides an air intake opening for the blower wheel as well as directing the air in a downward direction over the vertical walls forming the oven cavity. The discharge air forms a protective curtain to entrap any food soil and grease spatterings which might become separated from the food while being cooked in the oven before the food soil and grease spatterings are allowed to strike the vertical walls. The strong upward draft of air in the center of the oven carries the food soil and grease spatterings through the heating means where they are degraded into gaseous degradation products before being exhausted to the kitchen atmosphere through a standard oven exhaust vent. This single top source of heat delivers enough radiant heat by virtue of the fact that it heats the air diffusion plate to a high temperature and this provides satisfactory top browning of the food.

INVENTORS
BOHDAN HURKO
A. MELCHER ANDERSON
BY Richard L. Caslin
THEIR ATTORNEY

Patented Sept. 22, 1970

INVENTORS
BOHDAN HURKO
BY &A. MELCHER ANDERSON

Richard L. Caslin

THEIR ATTORNEY

SELF-CLEANING FORCED CONVECTION OVEN

BACKGROUND OF THE INVENTION

This invention relates to forced convection ovens of the type in which air is circulated through the oven cavity during the cooking operation.

It is known in the oven art that the forced circulation of air within a heated oven may reduce the average time for baking and roasting food between as much as 25 percent to 40 percent. Moreover, a forced convection oven has the advantage of more uniform cooking results.

An example of a known convection oven is shown in the Mills U.S. Pat. No. 2,408,331 which shows a forced convection oven with a single heating element in the bottom of the oven and with a fan or blower located adjacent the center of the element, and with a large baffle or false bottom of generally square shape in plan view positioned over the heating element. Another prior patent is that of Paul R. Staples U.S. Pat. No. 3,379,189 which is assigned to the same assignee as is the present invention. Staples shows a standard bake oven in the bottom of the oven and a standard broil element in the top of the oven there being a blower wheel positioned adjacent the center of the bottom wall. A small annular shield is mounted directly above the blades of the blower wheel to protect the wheel from spillage of food particles and grease spatterings without interfering with the air flow.

The principal object of the present invention is to provide a clean, forced convection oven with attendant benefits of speed and uniformity of cooking as well as an improved air flow pattern provided by an air moving means and a source of heat both located in the top of the oven to permit only limited soiling of the oven walls by food splatter whereby said food soil becomes entrained by an upward draft toward the intake of the air-moving means.

A further object of the present invention is to provide a forced convection oven with a single source of heat in the top of the oven for both baking and broiling where a top blower means is associated with the top heater to provide a larger oven capacity and a better appearance for the oven interior with no readily visible heating means since the bottom wall of the oven is unemcumbered by either a heating means or a blower.

A further object of the present invention is to provide a forced convection oven where both the heating and air movement means are located in the top of the oven to create a strong upward draft of air in the center of the oven and strong downward air curtains across the vertical walls forming the oven cavity, with an air diffusion plate cooperating with the blower means and the heating means as well as serving as a source of radiant heat for both browning the top of food being baked or roasted, as well as for use during broiling when the blower speed is reduced.

SUMMARY OF THE INVENTION

The present invention, in accordance with one form thereof, relates to a baking, roasting and broiling oven and particularly one with a forced air convection system where the heating means for baking is located in the top of the oven in association with both a blower means which cooperate to insure a strong upward draft of air in the center of the oven and to project a protective curtain downward along the vertical walls forming the oven cavity so that substantially all the food soil and grease spatterings become entrained in the air flow and are passed over the top heating means where they are converted into gaseous degradation products and are finally exhausted from the oven cavity. In the preferred embodiment an air diffusion plate cooperates with the blower means to govern the air flow pattern.

BRIEF DESCRIPTION OF THE DRAWING

Our invention will be better understood from the following description taken in conjunction with the accompanying drawings and its scope will be pointed out in the appended claims.

DESCRIPTION OF THE PREFERRED EMBODIMENT

Figure 1:
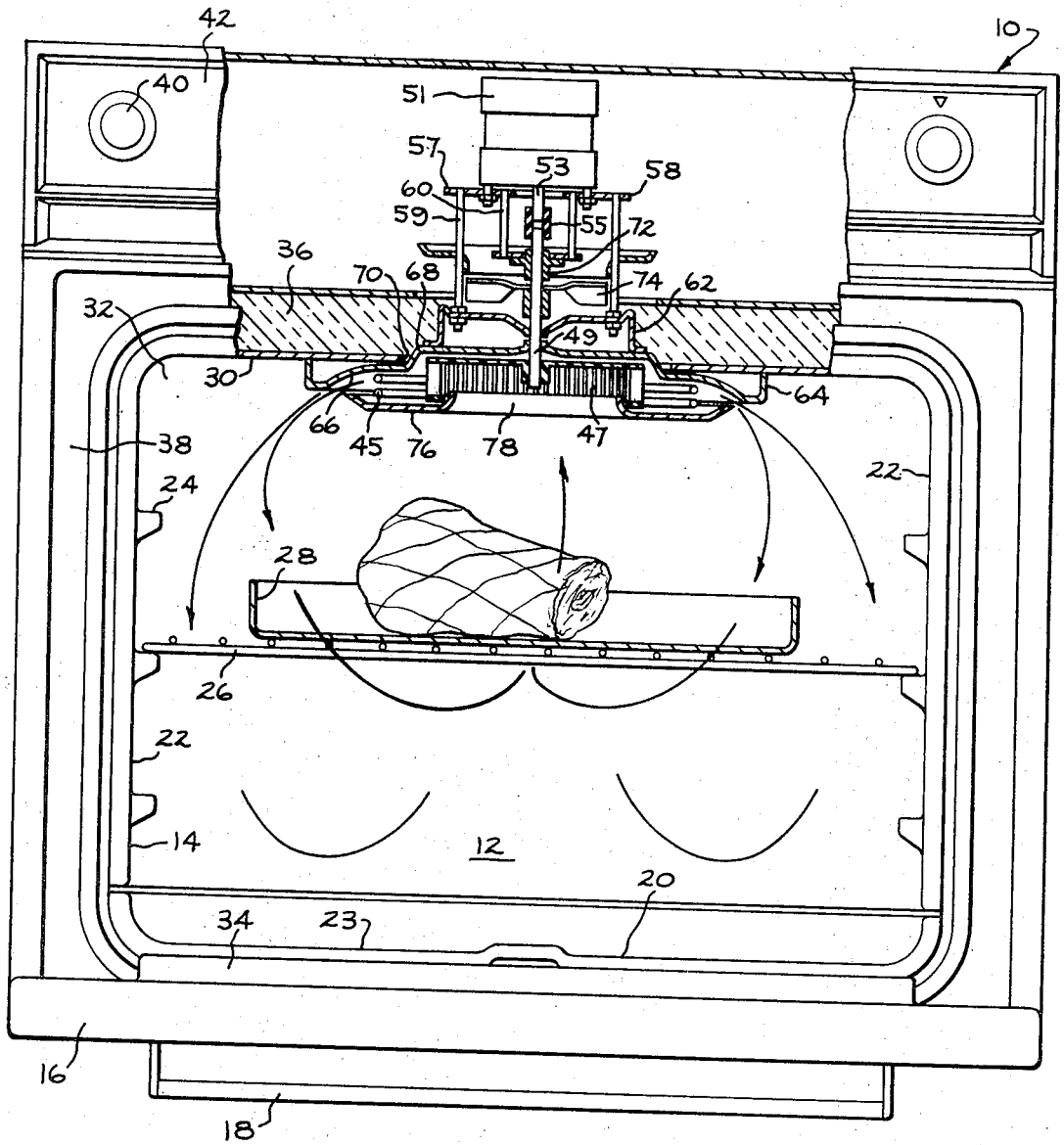
FIG. 1 is a front elevational view of a built-in wall oven embodying the present invention with the oven door hinged down into its fully open position and parts broken away at the top of the oven to show a motor-blower unit supported in the top wall of the oven, a heating element encircling the blower wheel and air diffusion plate means to govern the air flow pattern, as well as a removable tray with a non-stick finish in the bottom of the oven as an optional feature.

Turning now to a consideration of the drawings and in particular to FIG. 1, there is shown a built-in electric oven 10 in which the present invention is incorporated, although it will be understood by those skilled in this art that this invention is not limited to a particular built-in oven nor for that matter to a domestic oven, as the same invention could be used in free-standing ranges or in commercial or institutional cooking ovens. As in standard built-in oven construction, the oven includes a cooking cavity 12 formed by a box-like oven liner 14 and a front-opening access door 16 which is shown in this view in its horizontal, fully open position. The door 16 has a door handle 18 which may extend for nearly the complete width of the door and it would be located adjacent the top edge thereof, it being understood that the hinge axis of the door is located adjacent the bottom edge of the door. The oven liner 14 has a plain bottom wall 20 and opposite side walls 22, 22 which are formed with a plurality of vertically and horizontally spaced embossments or rack supports 24. Fitted onto the bottom wall is a removable tray 23 which substantially covers the bottom wall and is coated on its top surface with a non-stick coating such as polytetrafluoroethylene, silicone or the like. As an alternative the bottom wall of the oven liner could be of procelain, in the same manner as the other walls forming the oven cavity. One or more standard wire racks 26 would be furnished with the oven, and they could be slidable racks which may be pulled partially out of the oven for ease in loading or unloading a cooking pan 28 on the rack. The oven liner 14 also has a top wall 30 and a back wall 32. The top wall 30 includes a standard oven exhaust vent (not shown) for discharging the oven gases to the kitchen atmosphere. The front of the oven liner 14 is open and it is adapted to be closed by the inner side 34 of the oven door 16 when the door is in its vertical closed position. A layer of thermal insulating material 36 of fiberglass or the like surrounds the walls of the oven liner, and a similar insulating layer (not shown) would be found in the oven door 16 so as to retain within the oven the heat generated for the oven cooking process. The front of the oven is provided with a generally rectangular door frame 30 which surrounds the front of the oven liner. The control components 40 for the oven are located in a control panel 42 which is positioned above the oven and generally in the same vertical plane as the oven door 16 when it is in the closed position. Such control components 40 would include an oven selector switch, an oven thermostat and perhaps an oven timer, a meat thermometer indicator dial, indicator or pilot lights and other related elements. The oven includes a cabinet or body structure which encircles the insulated oven liner and the control panel into a unitary construction.

A single heating element 45, in the form of a metal sheathed resistance heating element, is located adjacent the top wall 30 of the oven liner, and it may be of single length with a double circular coil, one above the other in order to obtain the proper length of the heater on the order of 65 inches from terminal to terminal, and with a power rating of about 3,000 watts at 236 volts. The terminals (not shown) of the heating element 45 would be formed in two parallel ends which may either be connected into a terminal block (not shown) in the back wall 32 of the oven liner or they may extend through suitable openings in the back wall, and lead wires may be connected thereto in a manner that is well known in this art.

Air moving means in the form of a blower wheel 47 is mounted adjacent the top wall 30 of the oven liner and generally concentric with the heating element 45. The air intake is at the bottom of the blower and air is expelled centrifugally. The blower wheel 47 has its own vertical shaft 49, and there is a drive motor 51 that may be located directly above the blower wheel and spaced a distance from the blower wheel because of the high temperature conditions. The motor 51 has a vertical shaft 53, and there is a sleeve or coupling 55 fastened over the complementary ends of the two shafts 49 and 53 for connecting them together. The motor 51 is supported on a motor mount 57 comprising a flat top plate 58 supported by a series of vertical, radially spaced rods 59. The rods 59 are about four in number and are adapted to be fastened to a heat shield 62 of generally inverted circular pan shape that is in turn supported on a reflector pan 64. The reflector 64 is generally of square shape in plan view and it has a concave depression 66 on its underside in which the heating element 45 is disposed. A circular top embossment 68 of the reflector 64 is positioned in an enlarged opening 70 adjacent the center of the top wall 30 of the oven liner 14.

The reflector pan 64 is adapted to be fastened to the underside of the top wall 30 of the oven liner, and the heat shield 62 is adapted to be fastened to the top embossment 68 of the reflector pan. The rods 59 of the motor mount 58 are adapted to be attached to the top of the heat shield, and of course the motor 51 is adapted to be mounted on the top plate 58 of the motor mount 57.

A second set of shorter rods 60 extend downwardly from the top plate 58 and are adapted to support on their lower ends a shaft bearing plate 72 for the upper end of the elongated shaft 49 of the blower wheel 47. Another reason for the shaft 49 being elongated is that is central portion is adapted to support fan blades 74. The blades 74 are fixed to the shaft 49 between the heat shield 62 and the bearing plate 72 and rotate with the shaft to serve as a cooling means for the motor 51. The support rods 59 and 60 reduce the heat flow from the reflector pan 64 toward the shaft bearing 72.

An air diffusion plate 76 of generally annular shape is supported beneath the heating element 45 and it cooperates with the concave depression 66 of the reflector pan 64 such that the soiled oven air delivered from the blower wheel 47 is transformed into an atomized mist and first passes over the heating element 45 and then is directed out toward the four vertical walls 22, 22, 32 and 34 of the oven cavity where the air sweeps downwardly over the vertical walls in the manner of a protective air curtain and serves to pick up or entrap any food soil or grease spatterings emanating from the food being cooked in the pan 28 on the oven rack 26. Moreover, the air diffusion plate 76 has a large central opening 78 which is slightly rolled over to telescope within the lower portion of the blower wheel 47 and serves as an air inlet opening for the blower wheel such that a strong upward draft of air is created in the center of the oven again to pick up any food soil or grease spatterings emanating from the food being cooked in the pan 28. The bottom tray 23 with the non-stick coating will collect some food spillage and grease spatter but it will be easy to clean in the kitchen sink or automatic dishwasher. The oven air tends to recirculate through the blower means and the heating means where the food soil is transformed into an atomized mist and is decomposed passing over the heater before finally leaving the oven cavity through an oven exhaust vent.

This forced convection oven will provide fast cooking and also makes it possible to perform cooking in a clean oven with only one heating element at the top of the oven. For several decades, a standard electric oven has included a lower baking element and an upper broiling element. However, the present invention moves the baking element to the top of the oven and this one element can also perform the same function as the usual broiling element when it is used in conjunction with the air diffusion plate 76 and reflector pan 64 that become highly heated and radiates infrared energy down toward the food being broiled. During the broiling operation it is suggested that the fan be slowed down to allow the heating element to become glowing hot and reach the highest temperature for radiating infrared energy. As an alternative, the fan may be left inactive as in a standard oven. For purposes of this invention, the reflector pan 64 functions with the air diffusion plate as part of the air diffusion means. In many previous convection ovens the baking heat was delivered from the bottom of the oven. In order to balance the bottom and top browning of the food, the upper broiling element was also energized. If a separate broiling element were located beneath the air diffusion plate 76 the amount of top browning might be excessive.

It is realized that this invention might be difficult to envision since air is invisible and the air flow pattern is somewhat difficult to visualize. However, it is believed that no prior convection oven provided or could provide the thorough state of cleanliness of the walls of the oven cavity after both baking, roasting and broiling that would be comparable to the results obtained by the use of the present invention. Also, fast preheat is obtainable with a 3,000 watt upper element reaching a temperature of about 325°F. in 2 minutes 45 seconds as compared with a standard oven of about 4 minutes and 30 seconds. Since the heating element 45 is cooled by the blower wheel 47 it would be possible to utilize a higher wattage heating element for the same length of heater without reducing the reliability and expected life of the heating element.

Also, the invention provides a noticeably improved appearance of the oven interior due to the elimination of the bake element in the bottom of the oven and the fact that the upper heating element 45 is hidden by the air diffusion plate 46. It gives the impression of an oven with no internal heating means at all. In addition to the improved appearance there is also a larger capacity of the oven for the same outside dimensions because of the elimination of the lower heating element.

Figure 2:
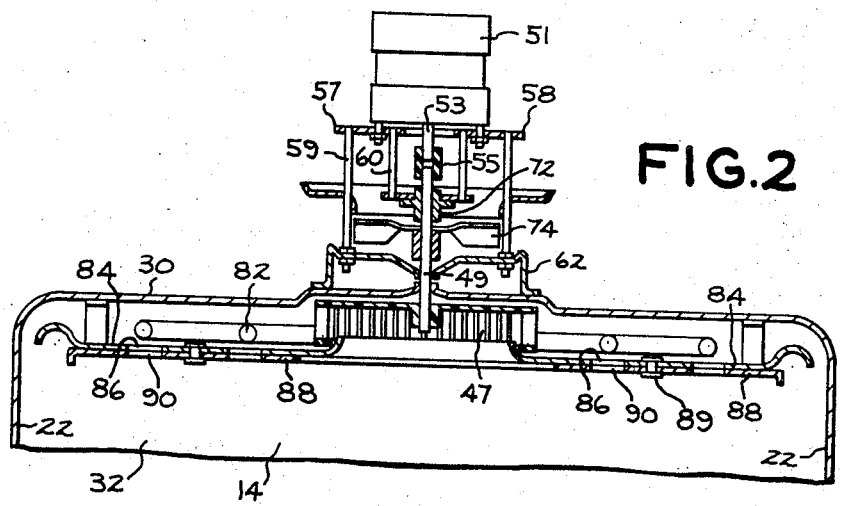
FIG. 2 is a fragmentary cross-sectional elevational view similar to the top portion of the oven liner of FIG. 1 and showing a second modification of the heating element and the air diffusion plate arrangement, where the plate has a plurality of adjustable orifices cooperating with the heating element, which orifices are opened before starting the broiling operation so that radiant energy may project through the orifices and onto the food being broiled.
Figure 3:
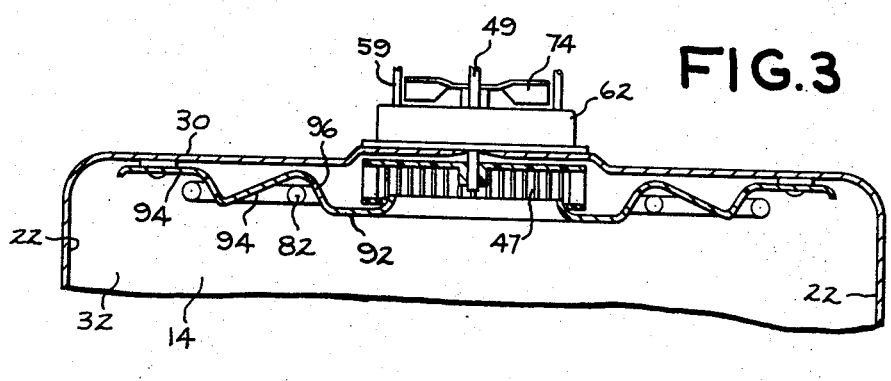
FIG. 3 is a cross-sectional elevational view similar to that of FIG. 2 showing a third modification where the air diffusion plate is formed with circular corrugations and is located generally above the top heating element and provided with a plurality of fixed orifices which are strategically located between the blower wheel and the heating element to direct the air from the blower wheel over the heating element and then down the vertical walls forming the oven cavity.
Figure 4:
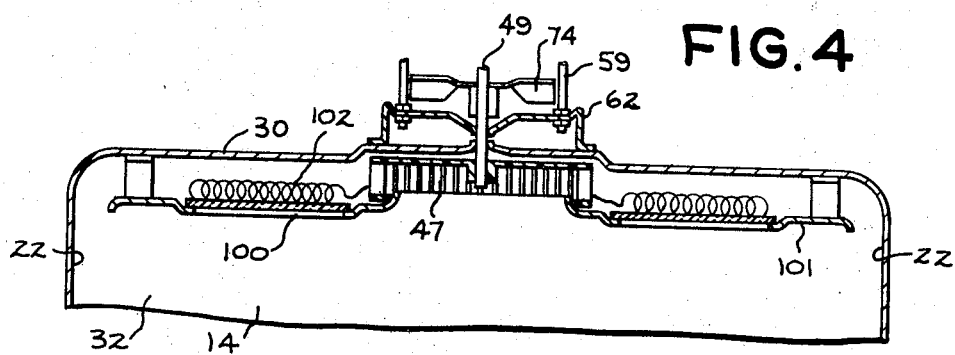
FIG. 4 is a fourth modification of the heating element and air diffusion plate of the present invention where the plate is formed of a high temperature glass such as quartz or some crystalline glasses that is transparent to infrared energy and serves as a supporting means for the heating element, which is shown in this example as an open coil heater.

During the broiling operation more radiant heat is required than during baking and this can be obtained by any one of the arrangements taught in FIGS. 2—4.

In the second modification of FIG. 2, the same elements carried over from the first modification of FIG. 1 will be identified by the same reference numerals. The blower wheel 47 and motor 51 are the same, however, there is a new heating element 82 of enlarged double coil form, where the coils are arranged in a single horizontal plane in the manner of a surface heating unit. There is no upper reflector pan such as element 64 in FIG. 1, but there is an enlarged air diffusion plate 84 to accommodate the enlarged heating element 82 and underlie the same. A plurality of orifices 86 are formed in the diffusion plate 84 in alignment with portions of the heating element 82 to permit the infrared energy of the heating element to project in a downward direction through the orifices. A suitable rotatable shutter 88 is carried beneath the diffusion plate and it likewise has orifices 90 which may be aligned with the orifices 86. The shutter 88 may be moved to close the orifices 86 in the diffusion plate for normal baking operations.

The orifices would be in the open position during the broiling operation. A suitable rivet and slot connecting means 89 joins the rotatable shutter 88 with the diffusion plate 84.

Again in the third modification of FIG. 3, the blower wheel 47 is the same but the diffusion plate has been changed to a diffusion plate 92 which is formed with a series of circular corrugations 94 in which the turns of the heating element 82 are placed from the underside thereof. Suitable orifices 96 are formed in certain side walls of the corrugations to be disposed between the blower wheel 47 and the turns of the heating element 82 so that the air from the blower wheel is directed over the heating element and then down the four vertical walls of the oven cavity, as in the previous modifications of FIGS. 1 and 2. One advantage of this modification is that the full radiant heat energy of the exposed heating element 82 is available for broiling operations while retaining the advantages of the forced convection feature of the prior modifications. Also the circular corrugated diffusion plate serves to focus the radiant energy of the heating element toward the food being cooked.

In the fourth modification of FIG. 4, the air diffusion plate has been replaced by an annular panel of high temperature glass 100 such as quartz or crystalline glass which is supported on a bracketed frame member 101 to be transparent to infrared energy from a heating element. This glass panel being of insulated material may then serve as the support means for the heating element, which in the present example is shown as an open coil heater 102 since it is protected from accidental touching by being covered on its underside by the air diffusion plate 100. During the baking operation the stream of air from the blower wheel 47 will keep the heated coils at a low temperature and only a small amount of radiant heat will be produced. During the broiling cycle the blower wheel 47 may be slowed down, in which event the heater element 102 would work in a manner comparable to a standard infrared broiler. The air flow would be just enough to entrap the particles of food soil and grease spatter.

Modifications of this invention will occur to those skilled in this art. Therefore, it is to be understood that this invention is not limited to the particular embodiments disclosed but that it is intended to cover all modifications which are within the true spirit and scope of this invention as claimed.

We claim:

1. A baking and broiling oven for use in food preparation, said oven including a cooking cavity formed by a box-like oven liner and a front-opening access door, radiant heating means located adjacent the underside of the top wall of the oven liner for heating foods placed therein, and blower means mounted adjacent the center of the heating means, an air diffusion plate means supported adjacent the heating means, said plate having a central opening serving as an air intake opening for the blower means, said blower means serving to direct air over the heating means and to project a protective air curtain down across the vertical walls of the oven cavity, and prevent food soil and grease spatter from reaching the walls, and a strong upward draft created in the center of the oven in which the food soil and grease spatterings become entrained, whereby the food soil and grease spatterings are recirculated over the heating means for decomposition into gaseous degradation products.

2. A self-cleaning electric baking and broiling oven comprising an oven cavity formed by a box-like oven liner and a front-opening access door, and electrical radiant heating element of coiled configuration located adjacent the underside of the top wall of the oven liner for heating food placed within the oven cavity, blower means mounted adjacent the center of the heating element, and an air diffusion means associated with the heating element and having a central opening serving as an air intake opening for the blower means, said diffuser means serving to direct the air from the blower means over the heating means and to project a protective air curtain down across the vertical walls of the oven cavity, the blower means creating an upward draft in the central region of the oven to entrap food soil and grease spatterings, whereby the food soil and grease spatterings are recirculated over the heating element for decomposition into gaseous degradation products.

3. A self-cleaning forced convection oven comprising an oven cavity with walls formed by a box-like oven liner and a front-opening access door, blower means mounted adjacent the top of the oven liner, an electrical radiant heating element closely associated with said blower means at the top of the oven for both baking and broiling operations, air diffusion means associated with the heating element and having an air intake opening aligned with the blower means and serving to direct the air from the blower means over the heating element and to project a protective air curtain down across the vertical walls of the oven cavity, the blower means creating a strong upward draft in the center of the oven whereby the central upward air draft and the outside downward protective air curtain washing the vertical walls of the oven cavity serve to entrap the food soil and grease spatterings emanating from the heated food and the soil laden air is recirculated over the heating element in a vaporized mist until the soil is decomposed into gaseous degradation products.

4. A self-cleaning forced convection oven as recited in claim 3 with a removable tray having a non-stick coating positioned in the bottom of the oven.

5. A self-cleaning forced convection oven as recited in claim 3 wherein the blower means includes a blower wheel inside the oven cavity and a motor means mounted outside the oven cavity above the oven liner, shaft means connecting the motor means with the blower wheel, heat shielding means located between the oven liner and the motor means to restrict the ambient temperature of the motor means.

6. A self-cleaning forced convection oven as recited in claim 5 wherein the said heat shielding means includes both a heat reflecting shield and a cooling fan formed as part of said shaft means for forcing air over the heat shield.

7. A forced convection oven having walls forming an oven cooking cavity, electrical heating means located in the top of the oven, air moving means located adjacent the center of the heating means, air diffusion means located beneath the heating means to direct the air from the air moving means over the heating means and then down over the vertical walls of the oven cavity, said diffusion means having an opening aligned with the air moving means and serving as an air inlet opening for the air moving means, said air diffusion means having a plurality of adjustable orifices aligned with the heating means such that when the orifices are open the radiant heat from the heating means is reflected in a downward direction toward the food to be broiled within the oven, said orifices being substantially closed during normal baking operations.

8. A forced convention oven as recited in claim 7 wherein the air moving means is convertible to be energized fully during normal baking operations and energized only partially during normal broiling operations to allow the heating means to reach its maximum operating temperature during broiling and transmit the maximum amount of radiant energy.

9. A forced convection oven having a box-like oven liner and an access door forming an oven cavity, a food carrying oven rack supported from the walls of the oven liner, a centrifugal blower located at the top of the oven adjacent the center thereof, said blower having an air intake at its lower center portion and an air discharge in radial directions in the plane of the blower, an air diffusion plate associated with the blower and having a central opening aligned with the air intake of the blower, circular corrugations formed in the diffusion plate, heating means located in at least some of the corrugations beneath the diffusion plate, a plurality of orifices in the diffusion plate aligned between the blower and the heating means, whereby the blower creates a strong upward draft in the center of the oven and discharges the air across the top of the diffusion plate as well as through the orifices and over the heating means, said diffusion plate directing the air flow down the vertical walls of the oven cavity until the air is reversed and caught up in the strong upward draft at the center of the oven.

10. A forced convection oven having walls forming an oven cooking cavity, a blower means located in the top portion of the cooking cavity, an open coil resistance heating element disposed adjacent the blower means, an air diffusion panel of high temperature glass that is transparent to infrared energy located beneath the heating element and supporting the same, the diffusion panel having a substantially central opening aligned with the blower means and serving as an air intake opening for the blower means, said blower means during a normal baking operation being capable of pulling air up the center of the oven and directing it over the heating element and then down across the vertical walls defining the oven cavity, while during broiling operations the blower means is operated at a slower speed to allow the heating element to reach it maximum operating temperature and give off radiant energy directed down through the air diffusion panel.

11. A baking and broiling oven for household use, comprising walls forming a box-like cooking cavity, electrical radiant heating means for said cavity positioned adjacent the underside of the top wall thereof, and not elsewhere in said cavity, blower means positioned within said heating means adjacent said top wall to circulate air from said cavity over said heating means and back to said cavity, at least one food-supporting means disposed in said cavity below said heating means and said blower, the intake to said blower means being generally at the center of said top wall to create an upward draft in the center region of said oven above said food-supporting means, the exhaust from said blower means being directed over said heating means and thence downwardly along the vertical walls of the oven cavity, whereby cooking may be accomplished in said oven with only limited soiling of the oven walls by food splatter, the food splatter being entrained by said upward draft and carried through said blower to said heating means for decomposition into gaseous products.